United States Patent [19]

Bayha et al.

[11] Patent Number: 5,445,890
[45] Date of Patent: Aug. 29, 1995

[54] BULLET RESISTANT GLASS/GLASS, GLASS/PLASTIC, AND PLASTIC/PLASTIC LAMINATE COMPOSITES

[75] Inventors: Charles E. Bayha; H. Arne Sudlow, both of Collierville, Tenn.

[73] Assignee: Resikast Corporation, Collierville, Tenn.

[21] Appl. No.: 254,879

[22] Filed: Jun. 6, 1994

Related U.S. Application Data

[62] Division of Ser. No. 916,714, Jun. 22, 1992, Pat. No. 5,318,853.

[51] Int. Cl.$^6$ ............................................. B32B 17/00
[52] U.S. Cl. ............................... 428/431; 428/412; 428/430; 428/480; 428/482; 428/483
[58] Field of Search ............... 428/430, 431, 480, 482, 428/483, 412

[56] References Cited

U.S. PATENT DOCUMENTS

| | | | |
|---|---|---|---|
| 1,937,396 | 11/1933 | Watkins | 49/81 |
| 3,334,008 | 8/1967 | Park et al. | 161/193 |
| 3,509,015 | 4/1970 | Wismer et al. | 161/190 |
| 3,522,142 | 7/1970 | Wismer et al. | 161/190 |
| 3,531,346 | 9/1970 | Jameson | 156/107 |
| 3,546,064 | 12/1970 | Hamilton et al. | 161/185 |
| 3,700,761 | 10/1972 | O'Dricoll et al. | 264/1 |
| 3,703,425 | 11/1972 | Delmonte et al. | 156/245 |
| 3,947,620 | 3/1976 | Plant et al. | 428/68 |
| 4,094,835 | 6/1978 | Omori et al. | 260/22 CB |
| 4,125,669 | 11/1978 | Triebel et al. | 428/412 |
| 4,131,635 | 12/1978 | Wilschut | 260/862 |
| 4,234,533 | 11/1980 | Langlands | 264/261 |
| 4,299,639 | 11/1981 | Bayer | 156/104 |
| 4,724,023 | 2/1988 | Marriott | 156/102 |
| 4,756,938 | 7/1988 | Hickman | 428/38 |
| 4,866,338 | 9/1989 | Ishigaki et al. | 313/478 |
| 4,923,756 | 5/1990 | Chung et al. | 428/423.7 |
| 5,096,980 | 3/1992 | Yamazaki et al. | 525/438 |

FOREIGN PATENT DOCUMENTS

| | | |
|---|---|---|
| 1516869 | 7/1978 | United Kingdom . |
| 2155856 | 10/1985 | United Kingdom . |

OTHER PUBLICATIONS

Handbook of Chemistry and Physics, 55th Edition, CRC Press, D-221 (1974-1975).

*Primary Examiner*—D. S. Nakarani
*Attorney, Agent, or Firm*—Spencer, Frank & Schneider

[57] ABSTRACT

This invention relates to multiple glass/plastic laminates for ballistic resistant and security applications. The laminates typically comprise a glass lite and a plastic sheet, such as polycarbonate, bonded with an adhesive based on a novel solvent free thermosetting alkyd resin. Subsequent layers can be polycarbonate sheets and/or acrylic sheets and glass lites with the adhesive layer separating the lites and sheets.

Further, this invention relates to a vertical liquid pour process which enables the rapid manufacture of bullet resistant glass/plastic laminates without the need for expensive ultra-violet or heat curing ovens. The adhesive cures at temperatures ranging from 60° F. to 90° F. High temperature and high pressure treatments are unnecessary. Laminates produced in this manner with adhesive interlayer will pass all intended ballistic or security tests within a 12 hour period.

12 Claims, 1 Drawing Sheet

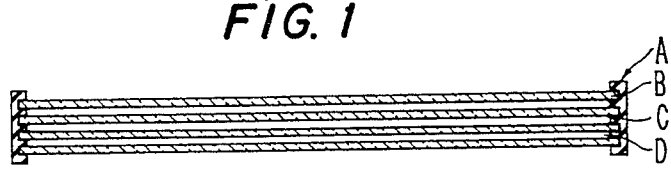
FIG. 1
FIG. 2
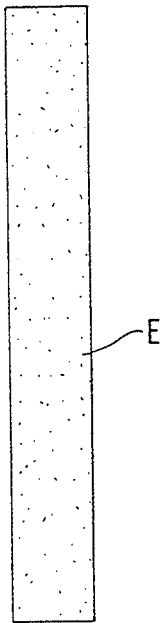
FIG. 3
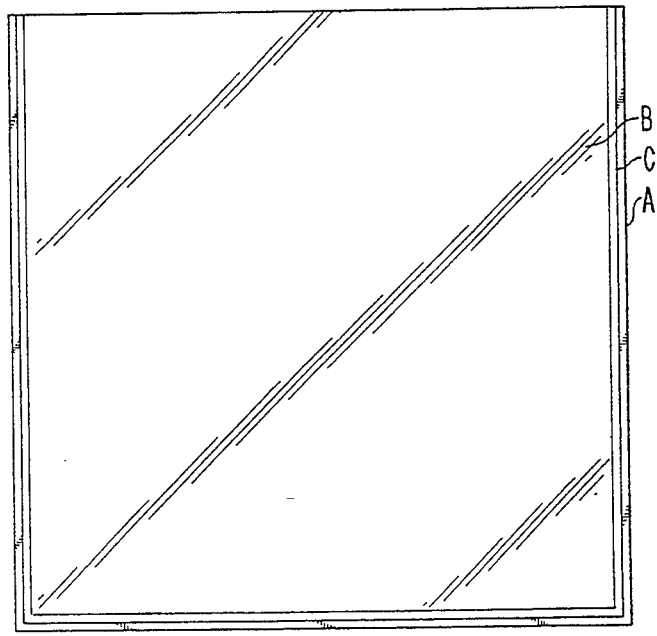

BULLET RESISTANT GLASS/GLASS, GLASS/PLASTIC, AND PLASTIC/PLASTIC LAMINATE COMPOSITES

CROSS-REFERENCE TO RELATED APPLICATION

This application is a division of application Ser. No. 07/916,714, filed Jun. 22, 1992, now U.S. Pat. No. 5,318,853 the entire specification of which is incorporated herein by reference.

BACKGROUND OF THE INVENTION

1. Field of the Invention

This invention relates to the fabrication of multiple glass/glass, glass/plastic, and plastic/plastic laminates for ballistic resistant and security applications.

2. Technology Review

Glass laminates as related to the ballistic and security applications involve the construction of alternate layers of glass lites and plastic sheets with an adhesive interlayer. For the most part the interlayer has been a meltable film based on polyvinyl butyral. This polymer film has been the basis of substantially all safety glass applications in automobile windshields and commercial/residential windows requiring impact resistance. In some areas, however, problems exist that made the use of polyvinyl butyral film difficult at best.

Originally, bullet resistant glass consisted primarily of alternating layers of glass lites ranging in thickness from $\frac{1}{8}$ to $\frac{3}{8}$ and polyvinyl butyral film, that was 30 to 90 mils in thickness. Since the film contains 30% plasticizer, the film rolls must be kept cool prior to use. The film is cut to the desired shape and placed between two lites of glass. The glass/film/glass composite is run through an oven in order to melt the film. Entrained air in the film is removed at this point by either vacuum or by roll compression. About 95% of the air is removed at this stage. The laminate is now subjected to 240–300F. temperature and 60–200 lb/sq. in. pressure in an autoclave to dissolve residual air, maintain film thickness and to achieve acceptable adhesion to glass. The production of multilayers of glass lites held together with polyvinyl butyral film is difficult at best.

With the introduction of tough, new plastics such as polycarbonate and acrylic sheets to replace some of the glass lites in order to produce light weight bullet resistant laminates, the problem associated with the use of polyvinyl butyral (P.V.B.) in multilayer applications became more severe. Adhesion of P.V.B. to the polycarbonate surface is marginal at best and delamination with time can occur. The high temperatures and pressures of the autoclave also can deteriorate the optical properties of the polycarbonate sheet. Alternative film development based on polyurethane has been commercialized and is currently offered as a replacement for P.V.B. in bullet resistant glass clad/polycarbonate composites. Although the adhesion to the polycarbonate has improved and impact strength is superior, air entrainment and increased costs vs. P.V.B. are disadvantages. Since the autoclave is still required, visual distorting of polycarbonates still can occur. Alternate urethane chemistry involves the application of a liquid, curable interlayer. In one case, the mix is comprised of two components— an isocyanate prepolymer and a polyol crosslinker. Advantages of this system is high temperatures and high pressures treatment are not necessary. Adhesion to the polycarbonate sheet is acceptable but the disadvantage is the removal of air when the liquid mix is introduced between the glass and polycarbonate sheets. Nominal thickness for bullet resistant glass clad polycarbonate sheets is 20–40 mils. A liquid mix with a viscosity greater than 300 cps. at 75° F. is extremely difficult to introduce in this space and at the same time remove entrained air. Other versions of urethane/acrylate modifications or methacrylate base liquid adhesives either etch the polycarbonate sheets or have severe air inhibition cure problems.

Unsaturated polyester resin systems have been used as liquid adhesives especially for television tube glass laminates. These types of resins can be formulated to have acceptable impact and energy absorbing properties for bullet resistant applications, but the major monomer employed in these types systems is styrene and styrene severely etches the surface of polycarbonate sheet, thus destroying the optical properties.

There have been prior patents regarding methods of making laminated glass using a liquid thermosetting resin. Two United States patents U.S. Pat. No. 3,703,425 to Delmonte and U.S. Pat. No. 4,234,533 to Langlands describe procedures for fabricating glass laminates using liquid thermosetting adhesives.

In the process described in the Delmonte patent, a flat glass lite is bowed in the center with a suction cup. Porous, double sided tape is applied at the edges of the glass. A second piece of glass is laid on top of the first. The double sided tape then seals the two pieces of glass together with a pool of resin between the lites in the center. The function of the tape is resin containment, thickness control and an outlet for entrapped air. A vacuum is applied around the glass lite. Air is removed through the tape pulling the resin to the tape. The glass laminate now remains flat until the liquid adhesive polymerizes to a solid.

In the process described in the Langlands patent, two lites of glass are adhered together with double sided porous tape at the edge on three sides. The fourth side is taped only on the edge of the lower plate. The protective film is partially removed. The two glass lites are fixed at a 45° angle. The resin is now introduced into a space between the lites. With $\frac{1}{8}$ glass lites, the glass bows to accommodate the resin. As the glass composite is lowered to a flat position the resin fills the void with the entrained air escaping at the fourth side. Removal of the protective film allows the laminate to be completely sealed. Any remaining trapped air can be removed by applying pressure to the surface of the laminate. The entrained air either escapes through the porous tape or is removed with a needle syringe.

It is an object of this invention to provide an improved simple yet effective procedure for fabrication of glass clad/polycarbonate and acrylic bullet resistant laminates.

SUMMARY OF THE INVENTION

This invention relates to multiple glass/glass, glass/plastic, and plastic/plastic laminates for ballistic resistant and security applications. The laminates typically comprise a glass lite and a plastic sheet, such as polycarbonate, bonded with an adhesive based on a novel solvent free thermosetting alkyd resin. Subsequent layers can be polycarbonate sheets and/or acrylic sheets and glass lites with the adhesive layer separating the lites and sheets.

This invention relates to a vertical liquid pour process which enables the rapid manufacture of bullet resistant glass/plastic laminates without the need for expensive ultraviolet or heat curing ovens. The adhesive cures at temperatures ranging from about 60° F. to 90° F. High temperature and high pressure treatments are unnecessary. Laminates produced in this manner with adhesive interlayer will pass ballistic or security tests within a 12 hour period.

BRIEF DESCRIPTION OF THE DRAWING

A typical configuration of a level four bullet resistant glass/polycarbonate is illustrated in the Figure and as an example consisting of the following configuration: ¼"(G), 30 mils(A), ⅜"(G), 30 mils(A), ¼"(P.O.), 30 mils(A), ¼"(P.C.), 30 mils(A), ⅜"(G), 30 mils(A), ⅛"(G)

A = adhesive
G = glass
P.C. = polycarbonate

DETAILED DESCRIPTION OF THE INVENTION

The glass and polycarbonate sheet are placed on edge and bonded together on three sides with double sided 30 mil tape. The edges of the glass/polycarbonate are heat bonded with polyisobutyl rubber strips. See the Figure. This invention is not, however, limited to this configuration. Combinations with only plastic sheets, combinations with only flat glass, and any other combination of plastic sheets and flat glass known to those skilled in the art can be used as an effective ballistic or security laminate.

An example of the process or method of making such laminates is as follows. As many as five to ten such configurations can be placed in a row on a wooden stand with slats running perpendicular to the edges of the laminate. The glass/plastic layers are connected on three sides with double sided tape. The edges are heat sealed with polyisobutyl rubber strips and the whole is placed vertically on its edge. Foamed rigid sheets are clamped on either side of the multiple laminates to prevent bowing of the laminates when the resin is introduced. The catalyzed resin is introduced into the space between the glass and plastic layers at the untaped open edge at the top. With the laminate in the vertical position, the resin easily enters the space between the glass and plastic sheets. Entrained air quickly comes to the surface and dissipates. After filling, the mix is allowed to react.

When the resin level reaches the top, further resin addition ceases. Cure temperature range preferably range from about 50 to about 100° F., and most preferably from about 60° F. to about 90° F. and the cure is complete within about a 12 hour period. The foamed sheets are removed about one hour after resin introduction to allow for heat dissipation. After the resin has cured, the top part of the laminate is heat sealed with polyisobutyl rubber strips. After 12 hours of curing, the laminate is ready for testing. The advantages of this fabrication technique include:
1. Ambient temperature cure.
2. Single rapid resin pour with rapid air removal.
3. Two component mix or optional three component mix.
4. Inexpensive fabrication equipment.

The production of these laminates is, however, not limited to just this method and can be produced by any of a number of methods known to those skilled in the art. There are alternative methods of fabricating, utilizing the basic approach of single pour of liquid resin between multiple layers of glass lite and/or plastic laminates.

Probe Method

The method allows for the automated and rapid addition of catalyzed resin between the glass/plastic interlayers with rapid air removal. This method is designed for the rapid production of large, multiple glass/plastic structures.

The glass/plastic structure are cut to size. Two sided, ⅛ wide tape is applied as before to the edges of structures. The structures are connected via the tape while on edge producing a composite structure. Distance between the structures is determined by the thickness of the tape. The tape, in this case, is not permeable. Unlike the previously described procedure, the structures are taped on all four sides. The polyvinyl butyl rubber is applied to all four sides. Resin probes are introduced at the top, right side through the rubber and tape seals. Catalyzed resin is introduced under pressure via these probes. Air removal is accomplished via vacuum probes introduced at the top, left side. When the void between the glass/plastic structure are filled, the probes are removed. As before, the mix is then allowed to react.

All liquid resin utilized in all of these procedures is fully described in my parent application Ser. No. 07/916,714, now U.S. Pat. No. 5,318,853, the entire disclosure of which is incorporated herein by reference.

In order that persons in the art may better understand the practice of the present invention, the following Examples are provided by way of illustration, and not by way of limitation. Additional background information known in the art may be found in the references and patents cited herein, which are hereby incorporated by reference.

| | EXAMPLES | | | | |
|---|---|---|---|---|---|
| | moles | mol. wt. | mole wt. | % charge | gms. |
| Example I Base Resin-flexible Oligomer Formation Reactants | | | | | |
| water | 1.25 | 18.0 | 22.5 | 1.49 | 59.6 |
| maleic anhydride | 1.00 | 98.0 | 98.0 | 6.48 | 259.2 |
| phthalic anhydride | 1.60 | 148.0 | 236.8 | 15.66 | 626.4 |
| adipic acid | 3.00 | 146.0 | 438.0 | 28.96 | 1158.4 |
| dipropylene glycol | 4.50 | 134.0 | 603.0 | 39.87 | 1594.8 |
| propylene glycol | 1.50 | 76.0 | 114.0 | 7.54 | 301.6 |
| gms. | | | 1512.3 | 100.00 | 4000.0 |
| Stabilizer: | 100 ppm (ethoxylated phosphoric acid); Albrastab 190 (Albright/Stevens Corp.) | | | | |
| Example II Base Resin-flexible | | | | | |
| water | 1.25 | 18.0 | 22.5 | 1.71 | 68.4 |
| maleic anhydride | 1.00 | 98.0 | 98.0 | 7.46 | 298.4 |
| phthalic anhydride | 1.60 | 148.0 | 236.8 | 18.07 | 722.8 |
| adipic acid | 3.00 | 146.0 | 438.0 | 33.33 | 1333.2 |
| 2-methyl-1,3 propane diol | 4.50 | 90.0 | 405.0 | 30.81 | 1232.4 |
| propylene glycol | 1.50 | 76.0 | 114.0 | 8.67 | 346.8 |
| gms. | | | 1314.3 | 100.00 | 4002.0 |
| Stabilizer: | 100 ppm (ethoxylated phosphoric acid) - Albrastab 190 (Albright/Stevens Corp.) | | | | |

Calc. Theo. $H_2O$ removed = 539.8 gms.

EXAMPLES

Cook Procedure (Examples I and II)

All ingredients are added to a 4 L. resin kettle equipped with mechanical stirrer, packed column, thermocouple, and an inert gas blanket inlet. The mix is heated with an electric mantle while stirring under an inert gas blanket at 200° C. until the acid number of the mix is 50 or below. An inert gas sparge is applied and the mix is cooked until the acid number is 15 or below and the Gardner viscosity is between a B and C (60% solids/40% styrene).

The solids are cooled to 150° C. and thinned with 25% butyl styrene with additional cooling. Tolylhydroquinone (30 ppm based on total resin mix) is added to the t-butylstyrene prior to thinning.

|  | moles | mol. wt. | mole wt. | % charge | gms. |
|---|---|---|---|---|---|
| Example III Base Resin-semi-flexible |  |  |  |  |  |
| water | 2.25 | 18.0 | 40.5 | 2.81 | 112.4 |
| maleic anhydride | 2.0 | 98.0 | 196.0 | 13.57 | 542.8 |
| adipic acid (Exxon) | 3.60 | 146.0 | 438.8 | 30.33 | 1218.2 |
| dicyclopentadiene | 0.40 | 132.0 | 52.6 | 3.64 | 145.6 |
| dipropylene glycol | 4.50 | 134.0 | 603.0 | 41.76 | 1670.4 |
| propylene glycol | 1.50 | 76.0 | 114.0 | 7.89 | 315.6 |
|  |  |  | 144.1 | 100.00 | 4000.0 |

Stabilizer: 100 ppm (ethoxylated phosphoric acid) - Albrastab 190 (Albright/Stevens)
Calc. Theo. water removed = 467.0 gms

| Example IV Base Resin-semi-flexible |  |  |  |  |  |
|---|---|---|---|---|---|
| water | 2.25 | 18.0 | 40.5 | 3.20 | 128.0 |
| maleic anhydride | 2.00 | 98.0 | 196.0 | 15.47 | 618.8 |
| adipic acid (Exxon) | 3.60 | 146.0 | 438.8 | 34.57 | 1382.8 |
| dicyclopentadiene | 0.40 | 132.0 | 52.6 | 4.15 | 166.0 |
| 2-methyl-1,5 pentane diol | 6.00 | 90.0 | 540.0 | 42.62 | 1704.8 |
|  |  |  | 1267.1 | 100.01 | 4000.4 |

Stabilizer: 100 ppm (ethoxylated phosphoric acid) - Albrastab 190 (Albright/Stevens)
Calc. Theo. Water removed = 582.5 gms Cook Procedure (Examples III and IV)

All ingredients are added except dicyclopentadiene. With the same type of equipment set up as in Examples I and II, the mix is heated to 200° C. and reaction water is removed until acid number is 50 or below. At this point the process is cooled to 170° C. and the dicyclopentadiene is added in 2 shots over a 45 minute period. After a 2 hour hold period at 170°–180 C., the whole is placed on main vent and sparged until the acid number is 14–18 and the GardnerHolt viscosity is 60% solid and 40% styrene equals B-C. From this point on all else remains the same as in Procedures for Examples I and II.

|  | moles | mol. wt. | mole wt. | % charge | gms |
|---|---|---|---|---|---|
| Example V Polyester Polyol-Silyated |  |  |  |  |  |
| dimethyl adipate | 1.000 | 174 | 174.0 | 46.51 | 1860.4 |
| diethylene glycol | 1.250 | 106 | 132.5 | 35.42 | 1416.8 |
| tetraethoxy silane | 0.325 | 208 | 67.6 | 18.07 | 722.8 |
|  |  |  | 374.1 | 100.00 | 4000.0 |

Catalyst: Titanate catalyst: 500 ppm (Tyzor T. E.-Dupont)
Calc. Theo. methanol distillate: 684.2 gms
Calc. Theo. ethanol distillate: 22.70 gms

| Example VI |  |  |  |  |  |
|---|---|---|---|---|---|
| dimethyl adipate | 1.00 | 174 | 174.0 | 49.14 | 1965.6 |
| 2-methyl, 1,3 propane diol | 1.250 | 90 | 112.5 | 31.77 | 1270.8 |
| tetraethoxy silane | 0.325 | 208 | 67.6 | 19.09 | 763.6 |
|  |  |  | 354.1 | 100.00 | 4000.0 |

Catalyst: Titanate Catalyst (Tyzor T. E.-Dupont)
Calc. Theoretical methanol distillate: 684.2 gms
Calc. Theoretical ethanol distillate: 22.70 gms Process Procedure (Examples V and VI)

All ingredients except tetra ethoxy silane are added to a 4 L. resin kettle equipped with mechanical stirrer, packed column, thermocouple, and an inert gas blanket inlet. The mix is heated with an electric mantle while stirring under an inert gas blanket at 200° C. until the Gardner-Holt viscosity is A-B. The whole is cooled to 50°–60° C. and the silane is slowly added to the whole. After a 2 hour hold period, the kettle is placed on main vent and the mix is sparged until the Gardner-Holt viscosity is G-H. The silylated polyester polyol is cooled to 60° C. and discharged. Cook Specifications (Example V and VI)

1. Polyol Color: 100 A.P.H.A. max.
2. Viscosity (Brookfield) at 25° C.: 1600–1800 cps
3. Molecular Weight (G.P.C.) range: 3000–4000.
4. Residual glycol>0.1%

Typical Glass Lamination Resin Formulations for Glass Clad/Plastic Applications, e.g. polycarbonate and or acrylic sheet Example VII - non-fire retardant
| 1. Example I (25% t-butyl styrene) | 66.7 pph |
|---|---|
| 2. t-Butyl styrene (Deltex) | 21.3 pph |
| 3. Styrene (Monsanto) | 5.0 pph |
| 4. 2-ethyl hexyl methacrylate (Bayer) | 2.0 pph |
| 5. Example VI | 5.0 pph |
| 6. Cobalt napthenate, 12% active (Mooney) | 180.0 ppm |
| 7. Copper napthenate, 6% active (Mooney) | 20.0 ppm |
| 8. Lithium octoate, 2% active (Mooney) | 1500.0 ppm |
| 9. Nonyl Benzyl, trimethyl ammonium chloride | 50.0 ppm |
| 10. Tinuvin 328 (Ciba/Geigy) | 1500.0 ppm |
|  | 100.3250 |

Specifications:
1. Color, A.P.H.A. — 50 max.
2. Viscosity, Brookfield, 25 C. — 150 cps.
3. Refractive Index — 1.5250–1.5270

Reactivity: 1 gram of a mixture of 50% methy ethyl ketone peroxide (8% active) + 50% 2,4-pentanedione peroxide with 99 gms of above formulation.
Gel time = 40 minutes
Peak, °F. = 115
Cure time = 100 minutes
Total time = 140 minutes Bullet resistant laminate made from the above are capable of passing Level 1 through Level 4 depending on ballet resistant testing configuration of glass and polycarbonate sheets, (AS -12).

Example VIII - fire retardant

| | |
|---|---|
| 1. Example II (25% tbutyl styrene) | 66.7 pph |
| 2. Dibromostyrene | 25.3 pph |
| 3. 2-ethyl hexxl methacrylate (Bayer) | 3.0 pph |
| 4. Example VII | 5.0 pph |
| 5. Cobalt Naphthenate, 12% active (Mooney) | 180.0 ppm |
| 6. Copper Naphthenate, 6% active (Mooney) | 20.0 ppm |
| 7. Lithium octoate, 2% active (Mooney) | 1500.0 ppm |
| 8. Nonyl Benzyl, trimethyl ammonium chloride | 50.0 ppm |
| 9. Tinuvin 328 (Ciba-Geigy) | 1500.0 ppm |
| | 100.3250 |

Above formulation is designed for attack glass applications. Specifications:

Specifications:

| | |
|---|---|
| 1. Color, Gardner | 2 max. |
| 2. Viscosity, Brookfield, 25 C. | 250 cps |
| 3. Refractive Index | 1.5320–1.5360 |

Reactivity: 1 gm mixture of 75% M.F.F.P. (8% active)
25% 2,4 Pentadione perioxide
99 gms of F.R. Formulation
Ge; Time: 55 minutes
Peak Exotherm, 0° F.: 125 F.
Cure time: 140 minutes
Total Time: 195 minutes Example IX - Casting Application

| | |
|---|---|
| 1. Example IV | 66.7 pph |
| 2. t-butyl styrene (Deltec) | 21.3 pph |
| 3. Styrene (Monsanto) | 5.0 pph |
| 4. 2-ethyl hexyl methacrylate (Bayer) | 2.0 pph |
| 5. Example VI | 5.0 pph |
| 6. Cobalt naphthenate, 12% Active (Mooney) | 200.0 ppm |
| 7. Cu naphthenate, 6% active (Mooney) | 20.0 ppm |
| 8. Lithium octoate, 2% active (Mooney) | 1500 ppm |
| 9. Tinuvin 328 (Ciba-Geigy) | 1500 ppm |
| | 100.3250 |

Specifications

| | |
|---|---|
| 1. color A.P.H.A. | 100 max |
| 2. Viscosity, Brookfield, 25 C. | 150 cps |
| 3. Refractive Index | 1.5250–1.5270 |

Reactivity: 1 gm of a mixture of 75% M.E.K.P. (8% active)
25% 2,4 pentane dione perioxide
99 gms of Casting formulation
Gel Time = 25 minutes
Peak Time, F. = 130
Cure Time = 90 minutes
Total Time = 115 minutes The above formulation can be used in thick casting applications for bullet resistance.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A glass laminate composite, comprising:
   at least two parallel sheets of glass joined by a layer of adhesive polyester prepared by cross-linking a pre-polymer, said pre-polymer prepared by preparing a linear polyester oligomer by reacting a mixture comprising at least one dibasic acid selected from the group consisting of adipic acid, phthalic anhydride, anhydride and maleic anhydride with at least one diol selected from the group consisting of dipropylene glycol and 2-methyl-1,3-propanediol to obtain a linear polyester oligomer having a molecular weight between about 900 and 1,200 measured by gel permeation chromatography;

adjusting the refractive index of said linear polyester oligomer to the refractive index of float glass by adding propylene glycol to said mixture of said dibasic acid and said diol;

and thinning said linear polyester oligomer with at least one monomer capable of cross-linking said linear polyester, said at least one monomer containing at least 60% by weight of t-butyl styrene, to obtain an adhesive polyester pre-polymer.

2. The glass laminate composite as set forth in claim 1, including adding a second polyester oligomer to said mixture prepared by reacting adipic acid, 2-methyl-1,3-propane-diol and propylene glycol to obtain a linear oligomer having a molecular weight of about 1000, and reacting said linear oligomer with $(C_2H_5O)_4Si$ and obtain a said second polyester oligomer having a molecular weight of about 3000.

3. The glass laminate composite set forth in claim 1, including at least one plastic sheet in parallel relation and spaced between said at least two parallel glass sheets, said plastic sheet joined to each of said glass sheets by a layer of said adhesive polyester.

4. The glass laminate composite set forth in claim 1, wherein said at least one monomer includes dibromostyrene.

5. A glass/plastic laminate, comprising:
   at least one plastic sheet in parallel relation and spaced from at least one glass sheet, said plastic sheet joined to said glass sheet by a layer of adhesive polyester prepared by cross-linking a pre-polymer, said pre-polymer prepared by preparing a linear polyester oligomer by reacting a mixture comprising at least one dibasic acid selected from the group consisting of adipic acid, phthalic anhydride, nadic anhydride and maleic anhydride with at least one diol selected from the group consisting of dipropylene glycol and 2-methyl-1,3-propanediol to obtain a linear polyester oligomer having a molecular weight between about 900 and 1,200 measured by gel permeation chromatography;

adjusting the refractive index of said linear polyester oligomer to the refractive index of float glass by adding propylene glycol to said mixture of said dibasic acid and said diol;

and thinning said linear polyester oligomer with at least one monomer capable of cross-linking said linear polyester, said at least one monomer containing at least 60% by weight of t-butyl styrene, to obtain an adhesive polyester pre-polymer.

6. The glass/plastic laminate as set forth in claim 5, including adding a second polyester oligomer to said mixture prepared by reacting adipic acid, 2-methyl-1,3-propane-diol and propylene glycol to obtain a linear oligomer having a molecular weight of about 1000, and reacting said linear oligomer with $(C_2H_5O)_4Si$ and obtain a said second polyester oligomer having a molecular weight of about 3000.

7. The glass/plastic laminate as set forth in claim 5, including at least one additional plastic sheet in parallel relation and spaced between said at least one plastic sheet and said at least one glass sheet, said at least one additional plastic sheet joined to each of said at least one plastic sheet and said at least one glass sheet by a layer of said adhesive polyester.

8. The glass/plastic laminate as set forth in claim 5, wherein said at least one monomer includes dibromostyrene.

9. A plastic/plastic laminate, comprising:
at least two parallel plastic sheets joined to each other by a layer of adhesive polyester resin prepared by cross-linking a pre-polymer, said pre-polymer prepared by preparing a linear polyester oligomer by reacting a mixture comprising at least one dibasic acid selected from the group consisting of adipic acid, phthalic anhydride, nadic anhydride and maleic anhydride with at least one diol selected from the group consisting of dipropylene glycol and 2-methyl-1,3-propanediol to obtain a linear polyester oligomer having a molecular weight between about 900 and 1,200 measured by gel permeation chromatography;
adjusting the refractive index of said linear polyester oligomer to the refractive index of float glass by adding propylene glycol to said mixture of said dibasic acid and said diol;
and thinning said linear polyester oligomer with at least one monomer capable of cross-linking said linear polyester, said at least one monomer containing at least 60% by weight of t-bytyl styrene, to obtain an adhesive polyester pre-polymer.

10. A plastic/plastic laminate as set forth in claim 9, including adding a second polyester oligomer to said mixture prepared by reacting adipic acid, 2-methyl-1,3-propane-diol and propylene glycol to obtain a linear oligomer having a molecular weight of about 1000, and reacting said linear oligomer with $(C_2H_5O)_4Si$ and obtain a said second polyester oligomer having a molecular weight of about 3000.

11. The plastic/plastic laminate as set forth in claim 9, including at least one plastic sheet in parallel relation and spaced between said at least two parallel plastic sheets, said plastic sheets joined to each other by a layer of said adhesive polyester resin.

12. The plastic/plastic laminate as set forth in claim 9, wherein said at least one monomer includes dibromostyrene.

* * * * *